US012738544B2

(12) United States Patent
Fan et al.

(10) Patent No.: US 12,738,544 B2
(45) Date of Patent: Sep. 15, 2026

(54) COLD PRESS PRESSURE CONTROL METHOD AND ELECTRONIC DEVICE

(71) Applicant: CONTEMPORARY AMPEREX TECHNOLOGY (HONG KONG) LIMITED, Hong Kong (CN)

(72) Inventors: Xiaoyun Fan, Ningde City (CN); Deming Lin, Ningde City (CN); Guotao Xie, Ningde City (CN); Tao Cheng, Ningde City (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 713 days.

(21) Appl. No.: 18/317,554

(22) Filed: May 15, 2023

(65) Prior Publication Data

US 2023/0327211 A1 Oct. 12, 2023

Related U.S. Application Data

(63) Continuation of application No. PCT/CN2021/121479, filed on Sep. 28, 2021.

(51) Int. Cl.

*H01M 10/058* (2010.01)
*H01M 4/04* (2006.01)
*H01M 10/04* (2006.01)

(52) U.S. Cl.

CPC ....... *H01M 10/058* (2013.01); *H01M 4/0435* (2013.01); *H01M 10/0404* (2013.01)

(58) Field of Classification Search

CPC ............. H01M 10/058; H01M 4/0435; H01M 10/0404; H01M 4/043; B30B 3/00;

(Continued)

(56) References Cited

U.S. PATENT DOCUMENTS 5,142,891 A * 9/1992 Kuwano ................. B21B 37/64 72/11.8
2010/0050721 A1* 3/2010 Tezuka .................. B21B 37/165 72/10.4

FOREIGN PATENT DOCUMENTS

CN 102847859 A 1/2013
CN 103316954 A 9/2013

(Continued)

OTHER PUBLICATIONS

Cho, S., Cho, Y., & Yoon, S. (1997). "Reliable roll force prediction in cold mill using multiple neural networks." IEEE transactions on neural networks, 8(4), 874-882, pp. 1-9 (Year: 1997).*

(Continued)

*Primary Examiner* — Robert E Fennema
*Assistant Examiner* — Magdalena I Kossek
(74) *Attorney, Agent, or Firm* — Ladas & Parry, LLP

(57) ABSTRACT

A cold press pressure control method includes: acquiring a current thickness of a cold-pressed pole piece and a current rolling speed of a cold press at the moment; determining a cold press output pressure or a cold press adjust pressure corresponding to the current thickness of the pole piece and the current rolling speed of the cold press according to the current thickness of the cold-pressed pole piece and the current rolling speed of the cold press at the moment, as well as a preset first association relationship or a preset second association relationship; and controlling the cold press to perform pressure output according to the cold press output pressure or the cold press adjust pressure, so that at the next moment, the cold press performs cold pressing on the pole piece according to the cold press output pressure. An electronic device for implementing the method is also provided.

9 Claims, 3 Drawing Sheets

(58) Field of Classification Search
CPC ......... B30B 15/26; B30B 3/005; B30B 11/20; Y02E 60/10
See application file for complete search history.

(56) References Cited

FOREIGN PATENT DOCUMENTS

| | | | | | |
|---|---|---|---|---|---|
| CN | 103325993 | A | | 9/2013 | |
| CN | 203437408 | U | * | 2/2014 | |
| CN | 104681775 | A | | 6/2015 | |
| CN | 108958071 | A | * | 12/2018 | ............. G05B 19/04 |
| CN | 109309190 | A | | 2/2019 | |
| CN | 110614274 | A | * | 12/2019 | ............... B21B 1/32 |
| CN | 113113561 | A | | 7/2021 | |
| DE | 3925104 | A1 | * | 2/1990 | ............. G05D 15/01 |
| FR | 2953765 | A1 | | 6/2011 | |
| GB | 1169381 | A | | 11/1969 | |
| JP | 2007063615 | A | | 3/2007 | |
| JP | 2011088172 | A | * | 5/2011 | |
| WO | 2016/151855 | A1 | | 9/2016 | |
| WO | 2020/110561 | A1 | | 6/2020 | |
| WO | 2021/140747 | A1 | | 7/2021 | |

OTHER PUBLICATIONS

English Machine Translation of JP-2011088172-A, pp. 1-33 (Year: 2011).*
English Machine Translation of CN-110614274-A, pp. 1-29 (Year: 2019).*
English Machine Translation of CN-108958071-A, pp. 1-41 (Year: 2018).*
English Machine Translation of DE-3925104-A1, pp. 1-12 (Year: 1990).*
English Machine Translation of CN-203437408-U, pp. 1-22 (Year: 2014).*
Communication pursuant to Article 94(3) EPC for Application 21 958 694.8 dated Jul. 3, 2025.
Chinese Notification of grant patent right for invention for Application 202180069466.5 dated Aug. 26, 2025.
International Search Report of WO2023050101 dated Jul. 4, 2022.
Written Opinion of The International Searching Authority of WO2023050101 dated Jul. 4, 2022.
Japanese Decision to Grant a Patent for copending Japanese Patent Application No. 2023-527057 dated Jun. 11, 2024.
Decision to Grant a Patent, dated Jun. 11, 2024, corresponding to JP Application No. 2023-527057.

* cited by examiner

Whether a cold press is turned on or not, and whether rollers start to rotate or not Yes Detect a current thickness of a cold-pressed pole piece and a current rolling speed of the cold press at the moment Determine an operating condition of the cold press at the moment Whether the current rolling speed of the cold press has increased or decreased by 10 m/min compared to a previous rolling speed Yes Call a second association subtable corresponding to the operating condition, and adaptively adjust the pressure Whether difference values between the current thicknesses and a preset target thickness are less than 1 micron or greater than 1 micron for two consecutive times or not Yes Less than 1 micron: released pressure XT * thickness difference value; greater than 1 micron: increased pressure XT * thickness difference value

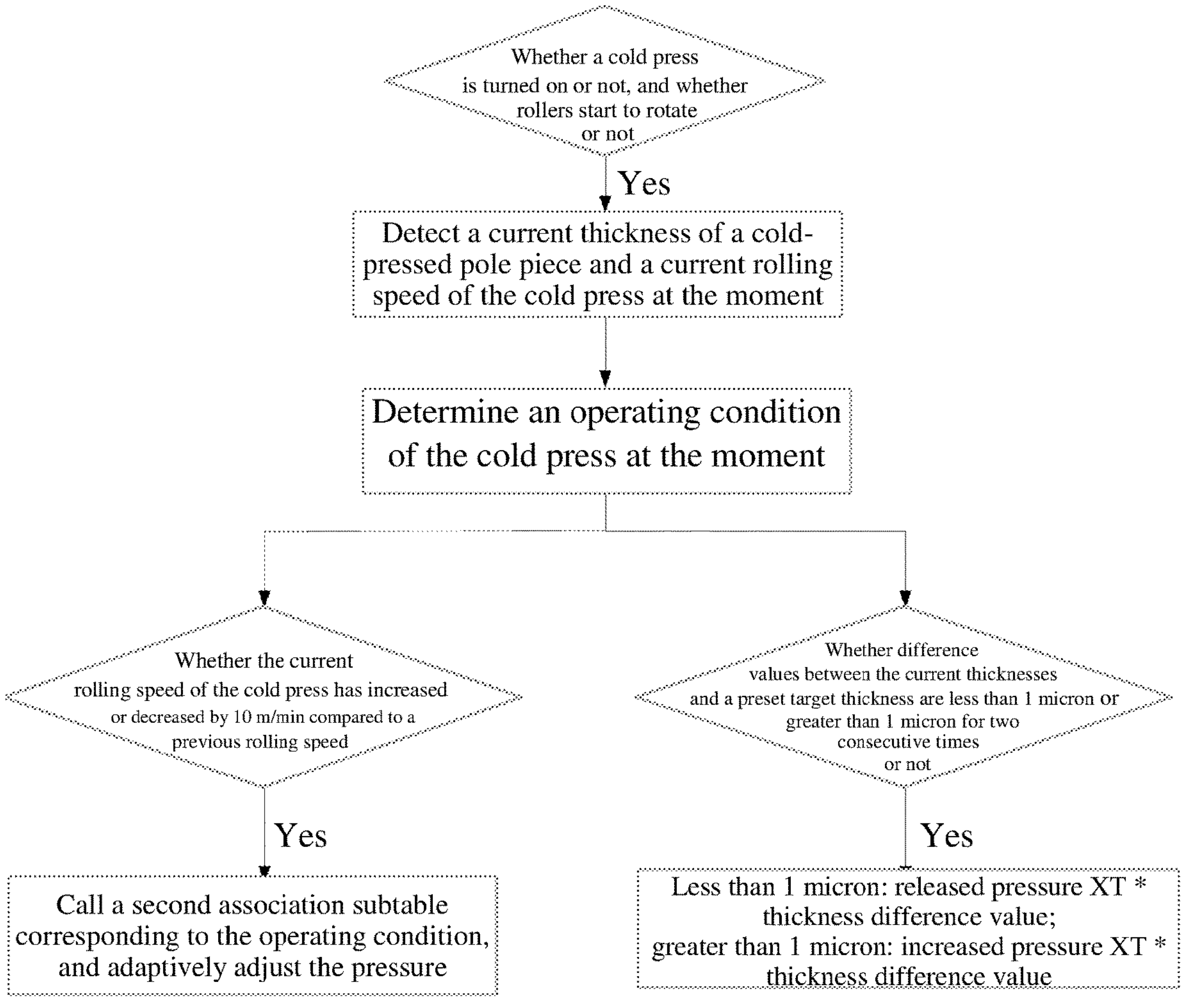

FIG. 3

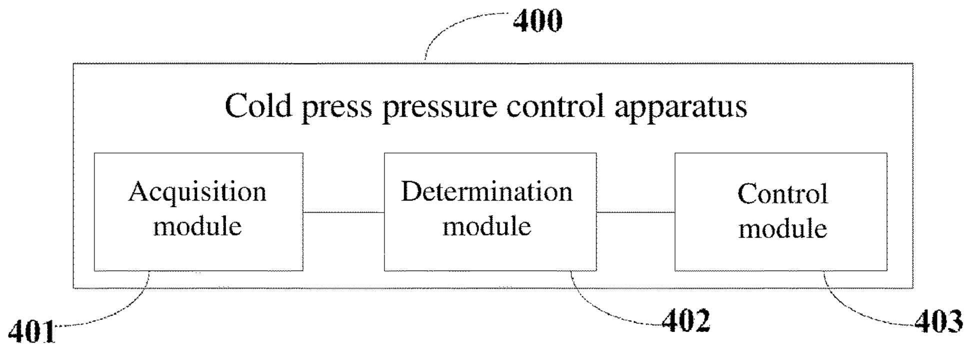

FIG. 4

COLD PRESS PRESSURE CONTROL METHOD AND ELECTRONIC DEVICE

CROSS-REFERENCE TO RELATED APPLICATIONS

The present application is a continuation of International application PCT/CN2021/121479 filed on Sep. 28, 2021, the entire content of which is incorporated herein by reference.

TECHNICAL FIELD

The present application relates to the field of battery manufacturing, and more particularly relates to a cold press pressure control method and an electronic device.

BACKGROUND

The preparation process of a battery pole piece usually includes pulping, coating, drying, rolling, cutting and other processes. Although the manufacturing process of different manufacturers or different batteries may vary, the rolling of the pole piece is an essential process. The pole piece can reach a certain compaction density after being rolled, which is very important for improving the energy density of a battery.

At present, the rolling of the pole piece is usually realized by a roller cold pressing technology, that is, the pole piece is rolled by a cold press to make the pole piece reach the designed compaction density. A current pressure control method for the cold press is to preset a corresponding rolling speed and pressure for the cold press, so that after the cold press is running, the pole piece is cold-pressed according to the set speed and pressure.

However, in the current method, there is a situation where the pressure does not match the actual speed. The current cold press pressure control technology controls the pressure only according to the rolling speed of the cold press, which cannot well satisfy actual needs, resulting in a large error of the rolled pole piece.

SUMMARY OF THE INVENTION

In view of the above problems, the present application provides a cold press pressure control method and an electronic device, so that the problem that an existing cold press pressure control technology cannot well satisfy actual needs, resulting in a large error of a rolled pole piece is solved.

In a first aspect, the present application provides a cold press pressure control method, including: acquiring a current thickness of a cold-pressed pole piece and a current rolling speed of a cold press at the moment; determining a cold press output pressure corresponding to the current thickness of the pole piece and the current rolling speed of the cold press according to the current thickness of the cold-pressed pole piece and the current rolling speed of the cold press at the moment, as well as a preset first association relationship; or, determining a cold press adjust pressure corresponding to the current thickness of the pole piece and the current rolling speed of the cold press according to the current thickness of the cold-pressed pole piece and the current rolling speed of the cold press at the moment, as well as a preset second association relationship, where the first association relationship is an association relationship among a pole piece thickness, a rolling speed of a cold press and the cold press output pressure, and the second association relationship is an association relationship among a pole piece thickness, a rolling speed of a cold press and the cold press adjust pressure; and controlling the cold press to perform pressure output according to the cold press output pressure or the cold press adjust pressure, so that at the next moment, the cold press performs cold pressing on the pole piece according to the cold press output pressure.

In the technical scheme provided by the present application, when the rolling speed fluctuates, the pressure output by the cold press can be adaptively adjusted according to the current rolling speed, so that the pressure output by the cold press matches the actual rolling speed of the cold press. In addition, the technical scheme provided by the present application combines the data including the current thickness of the cold-pressed pole piece and the current rolling speed of the cold press to control the pressure of the cold press, so that during cold press pressure control, influences of the rolling speed of the cold press on the pressure required by the pole piece, as well as influences of the pole piece thickness on the required pressure are considered, which makes the pressure output by the cold press is more in line with the actual demands, thereby making the error of the obtained pole piece smaller.

In some embodiments, the determining a cold press output pressure corresponding to the current thickness of the pole piece and the current rolling speed of the cold press according to the current thickness of the cold-pressed pole piece and the current rolling speed of the cold press at the moment, as well as a preset first association relationship includes: determining a current operating condition of the cold press according to the current rolling speed and a rolling speed at the previous moment; and determining the cold press output pressure corresponding to the current thickness of the pole piece and the current rolling speed of the cold press according to the current thickness and the current rolling speed, as well as the first association relationship corresponding to the current operating condition; and the determining a cold press adjust pressure corresponding to the current thickness of the pole piece and the current rolling speed of the cold press according to the current thickness of the cold-pressed pole piece and the current rolling speed of the cold press at the moment, as well as a preset second association relationship includes: determining a current operating condition of the cold press according to the current rolling speed and the rolling speed at the previous moment; and determining the cold press adjust pressure corresponding to the current thickness of the pole piece and the current rolling speed of the cold press according to the current thickness and the current rolling speed, as well as the second association relationship corresponding to the current operating condition.

It should be understood that in the practical application process, after the cold press with a target rolling speed set is started, the rolling speed of the cold press is not directly suddenly changed to the target rolling speed, in which there is a process of gradual increasing of the rolling speed, and then, the target rolling speed is reached, thereby achieving a relatively stable state. In addition, when the cold press shuts down or decelerates, there will also be a process of gradual decreasing of the rolling speed. In the different processes of gradual increasing of the rolling speed, stable rolling speed keeping, and gradual decreasing of the rolling speed, the cold press is essentially under different operating conditions. However, the inventor has found through a large number of experiments that there is a significant difference between the first association relationship and the second association relationship under these different operating conditions, that is, under different operating conditions, association relationships among the thickness of the cold-pressed pole piece, the rolling speed of the cold press and the pressure required for the cold pressing goal are quite different, and do not have good universality. In the above implementation scheme, the pressure control of the cold press is carried out by using the first association relationship or the second association relationship under different operating conditions, which makes the pressure control of the cold press implemented according to the actual association relationship under different operating conditions. Compared with the way of implementing pressure control by using a general association relationship, the pressure output by the cold press can be more in line with the actual demands, so that the error of the obtained pole piece is smaller.

In some embodiments, the acquiring a current thickness of a cold-pressed pole piece at the moment includes: acquiring a current first thickness of the pole piece at an operating side of the cold press and a current second thickness of the pole piece at a transmission side of the cold press at the moment;

the determining a cold press output pressure corresponding to the current thickness of the pole piece and the current rolling speed of the cold press according to the current thickness of the cold-pressed pole piece and the current rolling speed of the cold press at the moment, as well as a preset first association relationship includes: determining a first cold press output pressure corresponding to the operating side according to the current first thickness and the current rolling speed, as well as a preset first association relationship corresponding to the operating side; and determining a second cold press output pressure corresponding to the transmission side according to the current second thickness and the current rolling speed, as well as a preset first association relationship corresponding to the transmission side;

the determining a cold press adjust pressure corresponding to the current thickness of the pole piece and the current rolling speed of the cold press according to the current thickness of the cold-pressed pole piece and the current rolling speed of the cold press at the moment, as well as a preset second association relationship includes: determining a first cold press adjust pressure corresponding to the operating side according to the current first thickness and the current rolling speed, as well as a preset second association relationship corresponding to the operating side; and determining a second cold press adjust pressure corresponding to the transmission side according to the current second thickness and the current rolling speed, as well as a preset second association relationship corresponding to the transmission side; and the controlling the cold press to perform pressure output according to the cold press output pressure or the cold press adjust pressure includes: controlling the operating side of the cold press to perform pressure output according to the first cold press output pressure or the first cold press adjust pressure; and controlling the transmission side of the cold press to perform pressure output according to the second cold press output pressure or the second cold press adjust pressure.

It should be understood that in practical application, rollers of the cold press are arranged on the operating side and the transmission side, the operating side refers to one side that the rollers of the cold press are close to a user operating platform, and the transmission side refers to one side that the rollers of the cold press are away from the user operating platform and are connected to a motor so as to be controlled to rotate. Affected by factors such as different connection distances with the motor, there will be a certain difference in association relationship, at the operating side and at the transmission side, among the thickness of the cold-pressed pole piece, the rolling speed of the cold press, and the pressure required for the cold pressing goal. In the above implementation scheme, pressure control over the transmission side is realized by respectively adopting the pole piece thickness at the transmission side and the first association relationship or the second association relationship at the transmission side, pressure control over the operating side is realized by adopting the pole piece thickness at the operating side and the first association relationship or the second association relationship at the transmission side so that two-side differentiated pressure control over the rollers of the cold press can be realized, the output pressure is more in line with the actual demands, and the error of the obtained pole piece is smaller.

In some embodiments, the first association relationship includes: a second association subtable among a corresponding unit thickness adjust pressure required to be adjusted by the cold press during unit thickness change of the pole piece, the rolling speed of the cold press and the cold press adjust pressure, where the cold press adjust pressure includes a thickness adjust pressure and a speed adjust pressure;

the determining a cold press adjust pressure corresponding to the current thickness of the pole piece and the current rolling speed of the cold press according to the current thickness of the cold-pressed pole piece and the current rolling speed of the cold press at the moment, as well as a preset second association relationship includes: determining whether the current thickness of the cold-pressed pole piece satisfies a preset first pressure control condition or not and whether the current rolling speed of the cold press satisfies a preset second pressure control condition or not; determining a current thickness adjust pressure according to a difference value between the current thickness of the cold-pressed pole piece and a preset target thickness and the unit thickness adjust pressure when the current thickness of the cold-pressed pole piece satisfies the preset first pressure control condition; and determining a current speed adjust pressure corresponding to the current rolling speed according to a speed range where the current rolling speed is located and adjust pressures corresponding to different speed ranges when the current rolling speed satisfies the preset second pressure control condition; and correspondingly, the controlling the cold press to perform pressure output according to the cold press adjust pressure includes: controlling the cold press to perform pressure output according to the current thickness adjust pressure and/or the current speed adjust pressure and a current actual output pressure of the cold press.

In the above implementation scheme, by setting the first pressure control condition and the second pressure control condition, too frequent pressure control is avoided so that the pressure control frequency can be controlled within the acceptable error range allowed by the pole piece thickness in the cold pressing process, so as to avoid high-frequency control from affecting the life of the cold press. By pre-obtaining the second association subtable among the unit thickness adjust pressure, the rolling speed of the cold press and the cold press adjust pressure, independent control over the thickness change and the speed change can be realized during pressure control so as to be more in line with existing cold press control logics.

In some embodiments, the first pressure control condition is: difference values between the current thicknesses of the pole piece acquired for n1 consecutive times and the preset target thickness being greater than a preset first thickness change threshold; or difference values between the current thicknesses of the pole piece acquired for n2 consecutive times and the preset target thickness being less than a preset second thickness change threshold; both the n1 and the n2 are positive integers greater than or equal to 1; and the first thickness change threshold is greater than the second thickness change threshold.

In the above implementation scheme, the difference value between the current thickness of the pole piece and the preset target thickness is used as the basis for determinment, and the difference value between the current thickness of the pole piece and the preset target thickness can reflect the cold-pressing effect, and thus, through the above scheme, it is possible to effectively control the pressure in time when it is recognized that the cold-pressing effect of the pole piece is not very good, thereby ensuring the cold-pressing effect of the pole piece.

In some embodiments, the second pressure control condition is: the change of the current rolling speed being greater than a preset first speed change threshold, or the change of the current rolling speed being less than a preset second speed change threshold, where the change of the current rolling speed is a difference value between the current rolling speed of the cold press and the previous rolling speed, and the first speed change threshold is greater than the second speed change threshold.

In the above implementation scheme, by using the difference value between the current rolling speed of the cold press and the previous rolling speed as the basis for determinment, it is possible to effectively recognize the situation of great rolling speed changes so that timely pressure control can be performed, thereby ensuring the cold-pressing effect of the pole piece.

In some embodiments, the first association relationship and the second association relationship are regression models with a thickness, a speed and a pressure as variable values.

In the above implementation scheme, the regression model is used to realize the first association relationship or the second association relationship, so that when the first association relationship or the second association relationship is constructed, it is only necessary to perform volume sampling to construct a corresponding regression model, and the scheme is simple and reliable in implementation.

In some embodiments, after the cold press is stopped and restarted, the method further includes: acquiring a latest current thickness of the cold-pressed pole piece and a latest current rolling speed of the cold press; determining a cold press output pressure or cold press adjust pressure corresponding to the latest current thickness and the latest current rolling speed according to the latest current thickness and the latest current rolling speed, as well as the regression model before stop and restart; and controlling the stopped and restarted cold press to perform pressure output according to the cold press output pressure or cold press adjust pressure, so that at the next moment, the cold press performs cold pressing on the pole piece according to the cold press output pressure.

In the above implementation scheme, after the cold press is stopped and restarted, the pressure control is performed based on the regression model before stop and restart, which can ensure the normal operation of the cold press in the initial stage after stop and restart, and can guarantee the cold-pressing effect to a certain extent.

In some embodiments, after the determining a cold press output pressure or cold press adjust pressure corresponding to the current thickness and the current rolling speed according to the latest current thickness and the latest current rolling speed, as well as the regression model before stop and restart, and controlling the stopped and restarted cold press to perform pressure output according to the cold press output pressure or cold press adjust pressure, the method further includes: reacquiring a latest current thickness of the pole piece and a latest current rolling speed of the cold press at a pressure value newly output by the cold press; and updating, according to the reacquired latest current thickness, the reacquired latest current rolling speed and the pressure value, model parameters of the regression model when the reacquired latest current thickness satisfies preset reasonable thickness conditions, and the reacquired latest current rolling speed satisfies preset reasonable speed conditions.

In the above implementation scheme, the model parameters of the regression model are updated according to the reacquired latest current thickness, the reacquired latest current rolling speed and the pressure value, which realizes the automatic update of the regression model, thereby ensuring that the scheme can be adaptive for remodeling without manual intervention in scenes where major changes occur in situations of device components such as cutting and pulling type switching, roller gap adjustment, roller replacement and device maintenance.

In a second aspect, the present application further provides an electronic device, including: a processor, a memory and a communication bus. The communication bus is configured to realize connection and communication between the processor and the memory. The processor is configured to execute one or more programs stored in the memory so as to implement any cold press pressure control method above.

The above description is only a summary of the technical schemes of the present application. In order to understand the technical means of the present application more clearly, the technical means can be implemented according to the content of the specification. Furthermore, to make the above content and other objectives, features and advantages of the present application more comprehensible, specific implementations of the present application are exemplified below.

DESCRIPTION OF DRAWINGS

To more clearly describe the technical schemes of the embodiments of the present application, the drawings to be used in the embodiments of the present application will be briefly introduced below, and it should be understood that the following drawings only show some embodiments of the present application, and therefore should not be considered as limiting the scope. For those of ordinary skill in the art, other relevant drawings may also be obtained based on these drawings without creative efforts.

FIG. 3 is a specific schematic flowchart of cold press pressure control according to an embodiment of the present application;

FIG. 4 is schematic structural diagram of a cold press pressure control apparatus according to an embodiment of the present application.

DETAILED DESCRIPTION

Figure 1:
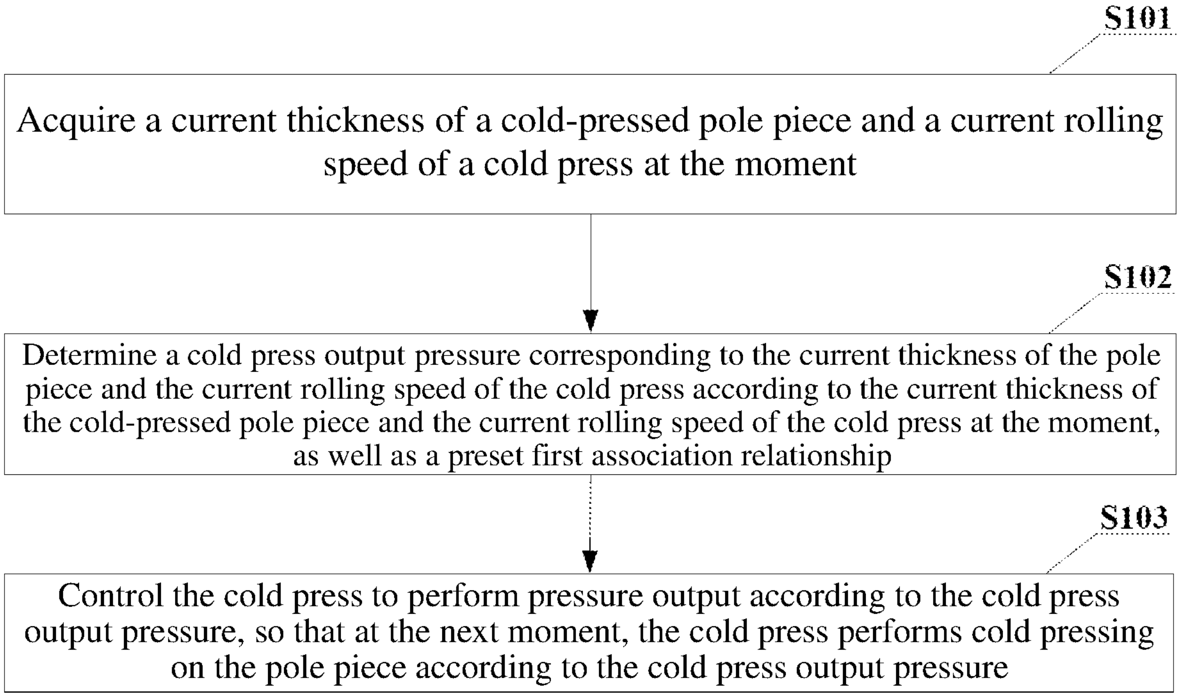
FIG. 1 is a schematic flowchart of a cold press pressure control method according to an embodiment of the present application.

Embodiments of technical schemes of the present application are described in detail below in conjunction with drawings. The following embodiments are only used to more clearly illustrate the technical schemes of the present application, and therefore are only used as examples but cannot be used to limit the scope of protection of the present application.

Unless otherwise defined, all technical and scientific terms used herein have the same meaning as commonly understood by those skilled in the art belonging to the technical field of the present application; the terms used herein are only for the purpose of describing the specific embodiments and are not intended to limit the present application; the terms "including" and "having" and any variations thereof in the specification and the claims of the present application and in the description of drawings above are intended to cover non-exclusive inclusion.

In the description of the embodiments of the present application, the technical terms "first", "second", etc. are used only to distinguish different objects, but not to be understood as indicating or implying a relative importance or implicitly specifying the number, particular order, or primary and secondary relationship of the indicated technical features. In the description of the embodiments of the present application, the meaning of "a plurality of" is two or more, unless otherwise explicitly and specifically defined.

A references herein to "an embodiment" means that a particular feature, structure, or characteristic described in combination with the embodiment can be included in at least one embodiment of the present application. The appearance of this phrase in various places in the specification does not necessarily refer to the same embodiment, nor is it a separate or alternative embodiment that is mutually exclusive from other embodiments. It is explicitly and implicitly understood by those skilled in the art that the embodiments described herein may be combined with other embodiments.

In the description of the embodiments of the present application, the term "and/or" is only an association relationship for describing associated objects, indicating that there may be three relationships, for example, A and/or B may represent three situations: A exists alone, both A and B exist, and B exists alone. In addition, the character "/" herein generally means that the associated objects before and after it are in an "or" relationship.

In the description of the embodiments of the present application, the term "a plurality of" refers to two or more (including two), and similarly, "multiple groups" refers to two or more (including two groups), and "multiple sheets" refers to two or more (including two sheets).

In the description of the embodiments of the present application, the orientation or position relationship indicated by the technical terms "center", "longitudinal", "transverse", "length", "width", "thickness", "upper", "lower", "front", "back", "left", "right", "vertical", "horizontal", "top", "bottom", "inner", "outer", "clockwise", "anticlockwise", "axial direction", "radial direction", "circumferential direction", etc. are based on the orientation or position relationship shown in the drawings and are intended to facilitate the description of the embodiments of the present application and simplify the description only, rather than indicate or imply that a device or element referred to must have a particular orientation or be constructed and operated in a particular orientation, and therefore are not to be understood as limitations on the embodiments of the present application.

In the description of the embodiments of the present application, unless otherwise expressly specified and limited, the technical terms "mount", "join", "connect", "fix", etc. should be understood in a broad sense, such as, a fixed connection, a detachable connection, or an integrated connection; a mechanical connection, or an electrical connection; a direct connection, an indirect connection through an intermediate medium, an internal communication of two elements, or interaction between two elements. Those of ordinary skill in the art can understand the specific meanings of the above terms in the embodiments of the present application according to specific situations.

Embodiment 1

At present, from the perspective of the development of the market situation, power batteries are more and more widely used. The power batteries are used in energy storage power systems such as hydraulic, thermal, wind and solar power stations as well as in electric vehicles such as electric bicycles, electric motorcycles and electric cars, and military equipment and aerospace fields. With the continuous expansion of the application field of the power batteries, the market demand is also constantly expanding. With the continuous increase of market demand, the quality requirements for the power batteries are also getting higher and higher.

The inventor notices that in the manufacturing process of the power batteries, a corresponding running speed and pressure are usually preset for a cold press during battery pole piece cold pressing at present, so that after the cold press is running, a pole piece is cold-pressed according to the set speed and pressure. However, during the entire process from start to stop of the cold press, the rolling speed is not always stable at the set rolling speed, and thus, in the current method, there is a situation where the pressure does not match the actual rolling speed. However, if the pressure does not match the actual rolling speed, the compaction density of the rolled pole piece may not satisfy preset error requirements, resulting in poor quality of the pole piece, which in turn leads to poor energy density of the manufactured batteries.

In order to solve the problem that the existing cold press pressure control technology cannot well satisfy the actual needs, resulting in a large error of the rolled pole piece, the applicant found that in the cold pressing process of the pole piece, in order to ensure that the effect of the cold-pressed pole piece is in line with expectations, there is an intrinsic complementary relationship between the thickness of the cold-pressed pole piece, the rolling speed of the cold press, and the pressure exerted by the cold press. In the present application, by pre-constructing and storing the association relationship, the pressure output by the cold press is adaptively adjusted, in response to the fluctuating rolling speed, based on the association relationship by acquiring the current thickness of the cold-pressed pole piece and the current rolling speed of the cold press at the moment, thereby making the pressure output by the cold press match the actual rolling speed of the cold press. In addition, the present application not only considers the influence of the pole piece thickness on the required pressure, but also considers the influence of the rolling speed of the cold press on the pressure required for the pole piece so that the pressure output by the cold press can be more in line with actual needs, and the error of the obtained pole piece is smaller.

Please refer to FIG. 1 below, and FIG. 1 illustrates a cold press pressure control method according to an embodiment of the present application, including:

S101: Acquire a current thickness of a cold-pressed pole piece and a current rolling speed of a cold press at the moment.

It should be noted that in the embodiment of the present application, a thickness gauge is arranged on or around the cold press so that the current thickness of the cold-pressed pole piece can be collected. It should be understood that the current thickness of the cold-pressed pole piece refers to the thickness of a cold-pressed part where the pole piece is currently rolled.

It should also be noted that in the embodiment of the present application, a speed sensor or a rotational speed sensor may also be arranged on the cold press, so as to collect and acquire the current rolling speed of the cold press.

S102: Determine a cold press output pressure corresponding to the current thickness of the pole piece and the current rolling speed of the cold press according to the current thickness of the cold-pressed pole piece and the current rolling speed of the cold press at the moment, as well as a preset first association relationship.

It should be noted that in the embodiment of the present application, the first association relationship refers to the association relationship between a pole piece thickness, a rolling speed of a cold press, and a cold press output pressure.

In the embodiment of the present application, the first association relationship can be constructed by massively pre-collecting, by an engineer, corresponding thicknesses of the cold-pressed pole piece at sampling points in the pole piece satisfying setting requirements after pole piece cold pressing, the rolling speed of the cold press at the moment and the output pressure of the cold press at the moment.

S103: Control the cold press to perform pressure output according to the cold press output pressure, so that at the next moment, the cold press performs cold pressing on the pole piece according to the cold press output pressure.

It should be noted that in the embodiment of the present application, the cold press output pressure refers to a final output pressure value of the cold press. After the cold press output pressure corresponding to the current thickness of the pole piece and the current rolling speed of the cold press is determined, it is only required to control the cold press to perform pressure output according to the cold press output pressure.

Figure 2:
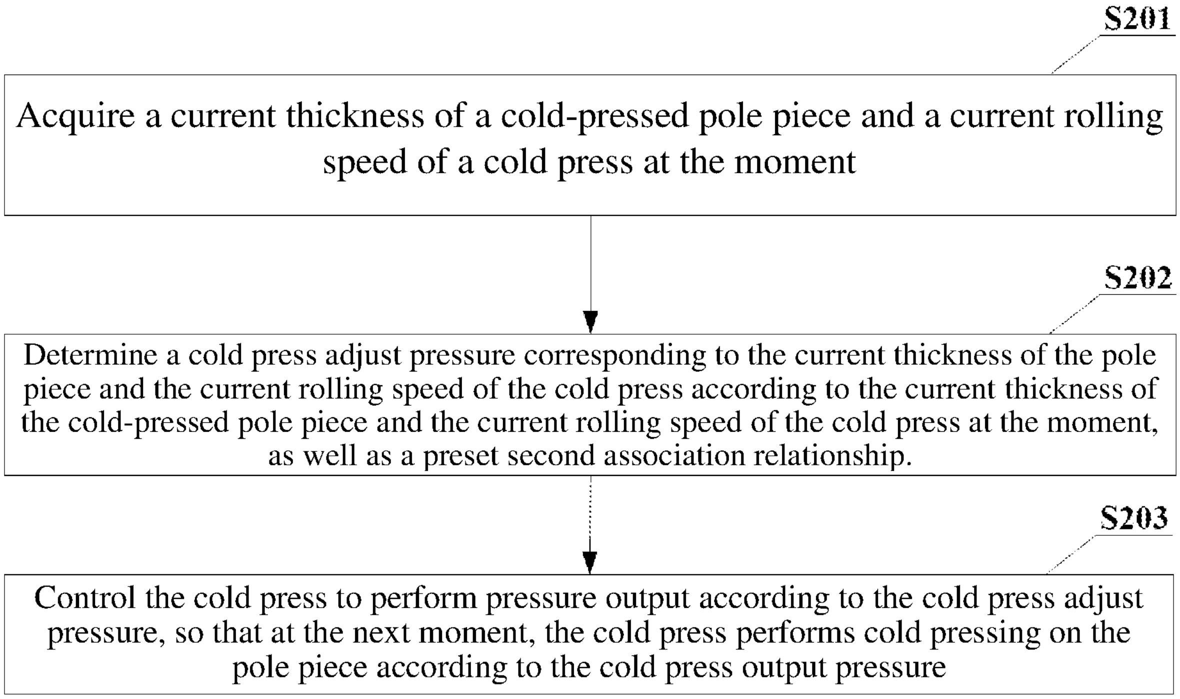
FIG. 2 is a schematic flowchart of another cold press pressure control method according to an embodiment of the present application.

In addition, please refer to FIG. 2, and FIG. 2 illustrates another cold press pressure control method according to an embodiment of the present application, including:

S201: Acquire a current thickness of a cold-pressed pole piece and a current rolling speed of a cold press at the moment.

Similarly, in the embodiment of the present application, a thickness gauge is arranged on or around the cold press so that the current thickness of the cold-pressed pole piece can be collected. A speed sensor or a rotational speed sensor may also be arranged on the cold press, so as to collect and acquire the current rolling speed of the cold press.

S202: Determine a cold press adjust pressure corresponding to the current thickness of the pole piece and the current rolling speed of the cold press according to the current thickness of the cold-pressed pole piece and the current rolling speed of the cold press at the moment, as well as a preset second association relationship.

It should be noted that in the embodiment of the present application, the second association relationship refers to the association relationship between a pole piece thickness, a rolling speed of a cold press, and a cold press adjust pressure.

In the embodiment of the present application, the second association relationship can be constructed by massively pre-collecting, by the engineer, corresponding thicknesses of the cold-pressed pole piece at sampling points in the pole piece satisfying setting requirements after pole piece cold pressing, the rolling speed of the cold press at the moment and the pressure adjusted by the cold press at the moment relative to a previous moment.

S203: Control the cold press to perform pressure output according to the cold press adjust pressure, so that at the next moment, the cold press performs cold pressing on the pole piece according to the cold press output pressure.

In the embodiment of the present application, the cold press adjust pressure refers to a pressure value required to be adjusted by the cold press. When the value is positive, it means increasing the pressure, and when the value is negative, it means reducing the pressure. After the cold press adjust pressure corresponding to the current thickness of the pole piece and the current rolling speed of the cold press is determined, control can be finished only by controlling the cold press to increase or reduce the corresponding cold press adjust pressure on the basis of the current output pressure.

Above, through the first association relationship or the second association relationship, the pressure output by the cold press can be adjusted adaptively as the current thickness of the cold-pressed pole piece and the current rolling speed of the cold press change, so that the pressure output by the cold press matches the actual rolling speed of the cold press and the actual cold-pressing effect of the cold-pressed pole piece, and thus the pressure output by the cold press can be more in line with the actual demands, and the obtained pole piece error is smaller.

In some implementations of the present application, a regression model may be constructed, and the constructed regression model may be used as the first association relationship or the second association relationship.

Exemplarily, the regression model can be constructed based on the collected thicknesses of the cold-pressed pole piece corresponding to the sampling points satisfying setting requirements after pole piece cold pressing, the rolling speed of the cold press at the moment and the output pressure of the cold press at the moment, and then the regression model serves as the first association relationship.

It should be noted that in the embodiment of the present application, in order to construct the regression model that can be used as the first association relationship, each sampling point can be mapped to a three-dimension coordinate system with the thickness of the cold-pressed pole piece, the rolling speed of the cold press and the cold press output pressure as coordinate axes, and the regression model is obtained through modes such as fitting.

Exemplarily, a regression model can be constructed based on the collected corresponding thicknesses of the cold-pressed pole piece corresponding to the sampling points satisfying setting requirements after pole piece cold pressing, the rolling speed of the cold press at the moment and the adjust pressure of the cold press at the moment relative to a previous moment, and then the regression model serves as the second association relationship.

It should be noted that in the embodiment of the present application, in order to construct the regression model that can be used as the second association relationship, each sampling point can be mapped to a three-dimension coordinate system with the thickness of the cold-pressed pole piece, the rolling speed of the cold press and the cold press adjust pressure as coordinate axes, and then the regression model is obtained through modes such as fitting.

It should also be noted that in the embodiment of the present application, the regression model may be a linear regression model, and the structure is $z=a+b*x+c*y$. Among them: z is the thickness of the cold-pressed pole piece; x is the rolling speed of the cold press; y is the cold press output pressure or the cold press adjust pressure; and a, b, c are model parameters, which are determined constant values. In addition, the regression model may also be a nonlinear regression model, such as $z=a+b*x^2+c*y^2$. In the embodiment of the present application, there is no limitation on the implementation form of the regression model used.

It should be understood that in the embodiment of the present application, the corresponding required y value (i.e., the cold press output pressure or the cold press adjust pressure) can be obtained by substituting the currently-acquired current thickness (i.e., the z value) of the cold-pressed pole piece and the current rolling speed (i.e., the x value) of the cold press based on the constructed regression model, and then the pressure output control of the cold press can be realized according to the above step S103 or step S203.

It should also be understood that in the embodiment of the present application, the above regression model may also be tabulated, so that a tabulated table may be used as the first association relationship or the second association relationship.

Exemplarily, according to a preset value interval, corresponding cold press output pressures or cold press adjust pressures are adopted under different pole piece thicknesses and different rolling speeds to obtain a discrete data table, such as shown in Table 1 below:

TABLE 1

| Pole piece thickness | Rolling speed | Cold press adjust pressure |
|---|---|---|
| z0 | x0 | y0 |
| z0 + Δz | x0 | y1 |
| z0 + 2Δz | x0 | y2 |
| z0 + 3Δz | x0 | y3 |
| . . . | . . . | . . . |
| z0 | x0 + Δx | y4 |
| z0 + Δz | x0 + Δx | y5 |
| z0 + 2Δz | x0 + Δx | y6 |
| z0 + 3Δz | x0 + Δx | y7 |
| . . . | . . . | . . . |
| z0 | x0 + 2Δx | y8 |
| z0 + Δz | x0 + 2Δx | y9 |
| z0 + 2Δz | x0 + 2Δx | y10 |
| z0 + 3Δz | x0 + 2Δx | y11 |
| . . . | . . . | . . . |

It should be understood that after the discrete data table is obtained, during use, whether the current thickness of the cold-pressed pole piece and the current rolling speed of the cold press have the same data in the above table or not can be first determined, and then when there is the same data, the cold press adjust pressure can be determined according to the above table.

Or, during use, it is possible to first determine which two value ranges the current thickness of the cold-pressed pole piece and the current rolling speed of the cold press fall in, and then based on the smaller value (or larger value, which can be set by the engineer) in the value range to determine the cold press adjust pressure. For example, assuming that the current thickness of the cold-pressed pole piece and the current rolling speed of the cold press are z1 and x1 respectively, z1 is greater than z0+Δz but less than z0+2Δz, and x1 is greater than x0 but less than x0+Δx, then the cold press output pressure corresponding to z0+Δz and x0 can be adopted to determine the cold press adjust pressure y1 corresponding to the current thickness of the pole piece and the current rolling speed of the cold press.

It should also be understood that the above table shows the second association relationship, so the cold press adjust pressure is determined, and the charting method of the first association relationship and the method of using the table are consistent with the above-mentioned method, and will not be repeated here.

It is worth noting that for the second association relationship, the inventor found after a large number of experiments that the cold press adjust pressure may be regarded as the sum of the adjust pressure required for the change of the pole piece thickness, and the adjust pressure required for the change of the rolling speed. Therefore, in the embodiment of the present application, the second association relationship may also be recorded through an association relationship table between the pole piece thickness and the unit thickness adjust pressure of the cold press (e.g., Table 2 below) and an association relationship table between the rolling speed and the speed adjust pressure (e.g, Table 3 below):

TABLE 2

| Pole piece thickness | Unit thickness adjust pressure |
|---|---|
| z0 | y00 |
| z0 + Δz | y01 |
| z0 + 2Δz | y02 |
| z0 + 3Δz | y03 |
| . . . | . . . |

It should be noted that the so-called unit thickness adjust pressure refers to the corresponding unit thickness adjust pressure that the cold press needs to adjust when the pole piece changes in unit thickness. In the present application, the column of the pole piece thickness in Table 2 represents the interval, such as z0, which represents the thickness interval from z0 (inclusive) to z0+Δz (exclusive).

TABLE 3

| Rolling speed | Speed adjust pressure |
|---|---|
| x0 | y10 |
| x 0 + Δx | y11 |
| x 0 + 2Δx | y12 |
| x 0 + 3Δx | y13 |
| . . . | . . . |

It should be noted that in the present application, the column of the rolling speed in Table 3 represents the interval, such as x0, which represents the rolling speed range from x0 (inclusive) to x0+Δx (exclusive).

It should also be noted that, in the embodiment of the present application, the division of intervals, that is, the values of $\Delta z$ and $\Delta x$, can be set by the engineer according to the technical requirements of cold pressing of pole piece.

During use, after the current thickness of the cold-pressed pole piece and the current rolling speed of the cold press at the moment are acquired, the total cold press adjust pressure can be determined only by making the current thickness of the cold-pressed pole piece correspond to Table 2 and the current rolling speed of the cold press correspond to Table 3.

Exemplarily, for the thickness adjust pressure, it can be determined which interval the current thickness corresponds to in Table 2, and then the current thickness adjust pressure is obtained by multiplying a difference value between the current thickness of the cold-pressed pole piece and a preset target thickness by the unit thickness adjust pressure.

It should be noted that in practical application, the inventor has found through a large number of experiments that for different thickness intervals, when the pole piece changes in unit thickness, the corresponding unit thickness adjust pressure required to be adjusted by the cold press is almost the same. Thus, in an optional implementation of the embodiment of the present application, Table 2 can be simplified to be about the unit thickness adjust pressure, so that after the current thickness of the cold-pressed pole piece is obtained, the current thickness adjust pressure can be obtained only by multiplying the difference value between the current thickness of the cold-pressed pole piece and the preset target thickness by the unit thickness adjust pressure.

Exemplarily, for the speed adjust pressure, it can be determined which interval a speed range involving the current rolling speed corresponds to in Table 3, and then the current speed adjust pressure corresponding to the current rolling speed can be determined.

It should be understood that in the above method, in order to ensure the effect of pressure control and to avoid too frequent pressure control from affecting the life of the cold press, it is possible to first determine whether the current thickness of the cold-pressed pole piece satisfies a preset first pressure control condition or not and determine whether the current rolling speed of the cold press satisfies a preset second pressure control condition or not before determining the current thickness adjust pressure and the current speed adjust pressure.

When the current thickness of the cold-pressed pole piece satisfies the preset first pressure control condition, the current thickness adjust pressure is determined according to the difference value between the current thickness of the cold-pressed pole piece and the preset target thickness and the unit thickness adjust pressure.

When the current rolling speed of the cold press satisfies the preset second pressure control condition, the current speed adjust pressure corresponding to the current rolling speed is determined according to the speed range where the current rolling speed is located and adjust pressures corresponding to different speed ranges.

It should be understood that if the first pressure control condition is satisfied but the second pressure control condition is not satisfied, the determined current thickness adjust pressure is used as the cold press adjust pressure, thereby controlling the cold press to perform pressure output. If the first pressure control condition is not satisfied but the second pressure control condition is satisfied, the determined current speed adjust pressure is used as the cold press adjust pressure, thereby controlling the cold press to perform pressure output. If both the first pressure control condition and the second pressure control condition are satisfied, the sum of the determined current thickness adjust pressure and the speed adjust pressure is used as the cold press adjust pressure, thereby controlling the cold press to perform pressure output. If neither the first pressure control condition nor the second pressure control condition is satisfied, no pressure adjustment is performed.

In the embodiment of the present application, the first pressure control condition may be: difference values between the current thicknesses of the pole piece acquired for n1 consecutive times and the preset target thickness being greater than a preset first thickness change threshold; or difference values between the current thicknesses of the pole piece acquired for n2 consecutive times and the preset target thickness being less than a preset second thickness change threshold.

Both n1 and n2 are positive integers greater than or equal to 1, which can be set by the engineer according to actual needs, such as 1 or 2. In addition, the first thickness change threshold should be greater than the second thickness change threshold.

In the embodiment of the present application, the second pressure control condition may be: the change of the current rolling speed being greater than a preset first speed change threshold, or the change of the current rolling speed being less than a preset second speed change threshold.

The change of the current rolling speed refers to a difference value between the current rolling speed of the cold press and the rolling speed at the previous moment. In addition, the first speed change threshold should be greater than the second speed change threshold.

In the embodiment of the present application, the first thickness change threshold, the second thickness change threshold, the first speed change threshold and the second speed change threshold can be set by the engineer according to actual needs.

It should be noted that in the practical application process, after the cold press with the target rolling speed set is started, the rolling speed of the cold press is not directly suddenly changed to the target rolling speed, in which there is a process of gradual increasing of the rolling speed, and then, the target rolling speed is reached, thereby achieving a relatively stable state. In addition, when the cold press shuts down or decelerates, there will also be a process of gradual decreasing of the rolling speed. In the different processes of gradual increasing of the rolling speed, stable rolling speed keeping, and gradual decreasing of the rolling speed, the cold press is essentially under different operating conditions. However, the inventor has found through a large number of experiments that there is a significant difference between the first association relationship and the second association relationship under these different operating conditions, that is, under different operating conditions, association relationships among the thickness of the cold-pressed pole piece, the rolling speed of the cold press and the pressure required for the cold pressing goal are quite different, and do not have good universality.

For this reason, in some implementations of the embodiment of the present application, when the first association relationship or the second association relationship is constructed, for each operating condition, the first association relationship or the second association relationship corresponding to each operating condition may be separately constructed.

Then, during cold press pressure control, the current operating condition of the cold press can be first determined according to the current rolling speed of the cold press and the rolling speed at the previous moment, and then, cold press output pressure or cold press adjust pressure corresponding to the current thickness of the pole piece and the current rolling speed of the cold press is determined according to the current thickness of the cold-pressed pole piece and the current rolling speed of the cold press, as well as the first association relationship or the second association relationship corresponding to the current operating condition.

It should be noted that the construction method of the first association relationship or the second association relationship corresponding to each operating condition can refer to the above, the difference is that the first association relationship or the second association relationship corresponding to each operating condition should be constructed based on data of the sampling points under the operating condition.

It should also be noted that the process of determining the cold press output pressure or the cold press adjust pressure corresponding to the current thickness of the pole piece and the current rolling speed of the cold press according to the current thickness of the cold-pressed pole piece and the current rolling speed of the cold press, as well as the first association relationship or the second association relationship corresponding to the current operating condition may refer to the above, which is not repeated herein.

It should be noted that in the embodiment of the present application, in order to accurately determine the current operating condition, the operating condition may be detected in the following manner:

When the current rolling speed is not within a preset standard operating speed range, the current rolling speed is higher than the rolling speed at the previous moment, and the speed change rate of the current rolling speed to the rolling speed at the previous moment is greater than a first preset change rate threshold, it is determined that the current operating condition of the cold press is a speed-up operating condition.

When the current rolling speed and the rolling speed at the previous moment are both within the standard operating speed range, it is determined that the current operating condition of the cold press is a steady-speed operating condition.

When the current rolling speed is not within the standard operating speed range, the current rolling speed is lower than the rolling speed at the previous moment, and the speed change rate of the rolling speed at the previous moment to the current rolling speed is greater than a third preset change rate threshold, it is determined that the current operating condition of the cold press is a speed-down operating condition.

Through the above manner, the current operating condition can be effectively determined. In addition, in the process of data sampling to construct the first association relationship or the second association relationship, the operating condition to which each sampling point belongs may also be determined through the above-mentioned manner.

It should also be noted that in practical application, rollers of the cold press are arranged on an operating side and a transmission side, the operating side refers to one side that the rollers of the cold press are close to a user operating platform, and the transmission side refers to one side that the rollers of the cold press are away from the user operating platform and are connected to a motor so as to be controlled to rotate. Affected by factors such as different connection distances with the motor, there will be a certain difference in association relationship, at the operating side and at the transmission side, among the thickness of the cold-pressed pole piece, the rolling speed of the cold press, and the pressure required for the cold pressing goal.

For this reason, in the embodiment of the present application, a corresponding first association relationship or second association relationship may be respectively established for the operating side and the transmission side of the cold press.

Therefore, in step S101 and step S201, the current first thickness of the pole piece at the operating side of the cold press and the current second thickness of the pole piece at the transmission side of the cold press may be acquired.

Furthermore, in step S102, first cold press output pressure corresponding to the operating side may be determined according to the current first thickness, the current rolling speed of the cold press, and the preset first association relationship corresponding to the operating side, and second cold press output pressure corresponding to the transmission side may be determined according to the current second thickness, the current rolling speed, and the first association relationship corresponding to the transmission side.

In step S202, first cold press adjust pressure corresponding to the operating side may be determined according to the current first thickness, the current rolling speed, and the second association relationship corresponding to the operating side; and second cold press adjust pressure corresponding to the transmission side may be determined according to the current second thickness, the current rolling speed, and the second association relationship corresponding to the transmission side.

Furthermore, in step S103, the operating side of the cold press is controlled to perform pressure output according to the first cold press output pressure; and the transmission side of the cold press is controlled to perform pressure output according to the second cold press output pressure.

In step S203, the operating side of the cold press is controlled to perform pressure output according to the first cold press adjust pressure; and the transmission side of the cold press is controlled to perform pressure output according to the second cold press adjust pressure.

Thus, pressure control over the transmission side is realized by respectively adopting the pole piece thickness at the transmission side and the first association relationship or the second association relationship at the transmission side, pressure control over the operating side is realized by adopting the pole piece thickness at the operating side and the first association relationship or the second association relationship at the transmission side so that two-side differentiated pressure control over the rollers of the cold press can be realized, the output pressure is more in line with the actual demands, and the error of the obtained pole piece is smaller.

It should be noted that in the embodiment of the present application, N (N is an even number greater than 0) thickness gauges and speed sensors can be uniformly arranged in the direction of the roller rotation axis of the cold press, so that there are N/2 sampling points during each sampling at each side to ensure sufficient sample data at both sides.

It should be noted that in the embodiment of the present application, after the cold press is stopped and restarted, in order to ensure the effect of cold pressing, according to a latest current thickness and a latest current rolling speed and a regression model before stop and restart, the cold press output pressure or the cold press adjust pressure corresponding to the latest current thickness and the latest current rolling speed is determined.

Then, according to the cold press output pressure or the cold press adjust pressure, the stopped and restarted cold press is controlled to perform pressure output, so that at the next moment, the cold press performs cold pressing on the pole piece according to the cold press output pressure.

It should be noted that in the above process of determining the cold press output pressure or the cold press adjust pressure corresponding to the latest current thickness and the latest current rolling speed according to the regression model before stop and restart, the cold press output pressure or the cold press adjust pressure corresponding to the latest current thickness and the latest current rolling speed may be directly calculated according to the regression model before stop and restart. In addition, in the process, the cold press output pressure or the cold press adjust pressure corresponding to the latest current thickness and the latest current rolling speed may be obtained according to the tabular first association relationship or second association relationship determined by the regression model before stop and restart.

It should be noted that in scenes where major changes occur in situations of device components such as cutting and pulling type switching, roller gap adjustment, roller replacement and device maintenance, the original regression model may have a large deviation, so the applicability is not strong.

Thus, in the embodiment of the present application, the cold press output pressure or the cold press adjust pressure corresponding to the current thickness and the current rolling speed is determined according to the latest current thickness, the latest current rolling speed and the regression model before stop and restart, and after the stopped and restarted cold press is controlled, according to the cold press output pressure or the cold press adjust pressure, to perform pressure output, the latest current thickness of the pole piece and the latest current rolling speed of the cold press at a pressure value newly output by the cold press can be reacquired.

When the reacquired latest current thickness satisfies preset reasonable thickness conditions, and the reacquired latest current rolling speed satisfies preset reasonable speed conditions, model parameters of the regression model are updated according to the reacquired latest current thickness, the reacquired latest current rolling speed and the pressure value, for pressure output, of the cold press.

Exemplarily, if the regression model is a regression model representing the first association relationship, it is only necessary to use the reacquired latest current thickness, the reacquired latest current rolling speed, and the pressure value output by the cold press as new samples to be added to a sample set for refitting, thereby updating the model parameters of the regression model.

If the regression model is a regression model representing the second association relationship, it is only necessary to use the reacquired latest current thickness, the reacquired latest current rolling speed, and a difference value between a pressure value newly output by the cold press and the pressure value output at the previous moment as new samples to be added to the sample set for refitting, thereby updating the model parameters of the regression model.

Accordingly, the regression model can be automatically updated, so as to ensure that the schemes can be adaptive for remodeling without manual intervention in scenes where major changes occur in situations of device components such as cutting and pulling type switching, roller gap adjustment, roller replacement and device maintenance.

It should be noted that in the embodiment of the present application, after each time the cold pressing of a roll of pole piece is completed, obtained each-time pressure data satisfying design requirements in the current completion process, and the corresponding rolling speed and pole piece thickness can be automatically memorized, and then, regression model refitting is performed based on the data to update the regression model.

It should also be noted that for the scheme that adopts the tabular first association relationship or the second association relationship to realize pressure control, after updating the model parameters of the regression model, tabulation should be performed again to ensure subsequent pressure control reliability.

It should also be noted that in the embodiment of the present application, the reasonable thickness conditions may be: difference values between latest current thicknesses acquired m consecutive times and the preset target thickness being less than or equal to a preset third thickness change threshold, and greater than or equal to a preset fourth thickness change threshold.

Where m is a positive integer greater than or equal to 1; and the third thickness change threshold is greater than the fourth thickness change threshold.

In the embodiment of the present application, the reasonable speed conditions may be: a difference between the reacquired latest current rolling speed and the last acquired latest current rolling speed being less than or equal to a preset third speed change threshold, and a difference between the reacquired latest current rolling speed and the last acquired latest current rolling speed being greater than or equal to a preset fourth speed change threshold.

The third speed change threshold is greater than the fourth speed change threshold.

In the embodiment of the present application, the third thickness change threshold, the fourth thickness change threshold, the third speed change threshold and the fourth speed change threshold can be set by the engineer according to actual needs.

It should also be noted that in the embodiment of the present application, the target thickness is a thickness value set according to process requirements.

According to the cold press pressure control method according to the embodiment of the present application, when the rolling speed fluctuates, the cold press output pressure can be adaptively adjusted according to the current rolling speed, so that the cold press output pressure matches the actual rolling speed of the cold press. In addition, the cold press pressure control method according to the embodiment of the present application combines the data including the current thickness of the cold-pressed pole piece and the current rolling speed of the cold press to perform cold press pressure control, so that when cold press pressure control is performed, influences of the rolling speed of the cold press on pressure required by the pole piece and influences of the pole piece thickness on the required pressure are considered, and accordingly, the pressure output by the cold press is more in line with the actual demands, thereby making the error of the obtained pole piece smaller.

Embodiment 2

On the basis of Embodiment 1, this embodiment further illustrates the technical scheme of the present application by taking a more specific implementation process as an example.

First, operating conditions are classified, and the operating process of a cold press is divided into a speed-up operating condition, a steady-speed operating condition and a speed-down operating condition.

Thicknesses of a cold-pressed pole piece corresponding to sampling points satisfying setting requirements under various operating conditions, a rolling speed of the cold press at the moment and an output pressure of the cold press at the moment are respectively collected.

The data of the sampling points is divided according to which one of an operating side and a transmission side of the cold press the sampling points belong to.

Each operating condition being a unit, the data of the sampling points corresponding to the operating side under the various operating conditions is mapped to a three-dimension coordinate system with the thickness of the cold-pressed pole piece, the rolling speed of the cold press and a cold press output pressure as coordinate axes, and a regression model at the operating side under each operating condition is obtained through a fitting mode.

Each operating condition being a unit, the data of the sampling points corresponding to the transmission side under the various operating conditions is mapped to the three-dimension coordinate system with the thickness of the cold-pressed pole piece, the rolling speed of the cold press and the cold press output pressure as the coordinate axes, and a regression model at the transmission side under each operating condition is obtained through a fitting mode. The regression model structure is $z=a+b*x+c*y$. Among them: z is the thickness of the cold-pressed pole piece; x is the rolling speed of the cold press; y is the cold press output pressure; and a, b, c are model parameters, which are determined constant values.

After each regression model is obtained, according to process requirements, each regression model is processed in a tabular form and converted into a second association subtable among a corresponding unit thickness adjust pressure required to be adjusted by the cold press when the pole piece changes in unit thickness, and the rolling speed and the speed adjust pressure of the cold press.

Exemplarily, a fixed x value may be set, and then two z values in unit change are taken to obtain two y values, and then a difference between the two y values is taken to obtain a unit thickness adjust pressure XT required to be adjusted by the cold press.

For the second association subtable, a fixed z value (e.g., the target thickness value) may be taken, and then speed range division is performed according to the process requirements. For example, 10 m/min serves as a range, cold press output pressures corresponding to a plurality of speed values in the speed range are calculated, and pressure difference values between the cold press output pressures corresponding to the speed values are calculated and averaged, thereby obtaining a speed adjust pressure corresponding to the speed range, and constructing the second association subtable.

Exemplarily, assuming that for the speed range of 0 m/min (inclusive) to 10 m/min (exclusive), the z value is taken as the target thickness value, and the cold press output pressures respectively corresponding to the x value being 0, 1, 2, 3, 4, 5, 6, 7, 8 and 9 are y0 to y9. A difference value between y1 and y0, a difference value between y2 and y1, a difference value between y3 and y2 . . . a difference value between y9 and y8 are sequentially calculated to obtain $\Delta y1$ to $\Delta y9$, and the average value of $\Delta y1$ to $\Delta y9$ is taken to serve as the speed adjust pressure corresponding to the speed range from 0 m/min (inclusive) to 10 m/min (exclusive).

Thereafter, cold press pressure control can be carried out accordingly.

Please refer to FIG. 3, including:

First, determine whether the cold press is turned on or not and whether the rollers start to rotate or not.

Detect a current thickness of the cold-pressed pole piece and a current rolling speed of the cold press at the moment.

Determine an operating condition of the cold press at the moment. For a determining method, refer to the record of Embodiment 1, which is not repeated herein.

determine whether the current rolling speed of the cold press has increased or decreased by 10 m/min compared to a previous rolling speed.

If so, call the second association subtable corresponding to the operating condition, determine a speed range where the current rolling speed is, and obtain a corresponding speed adjust pressure. Control the cold press to increase the speed adjust pressure if the current rolling speed has increased by 10 m/min compared to the previous rolling speed; and control the cold press to decrease the speed adjust pressure if the current rolling speed has decreased by 10 m/min compared to the previous rolling speed.

determine whether difference values between the current thickness of the cold-pressed pole piece and the preset target thickness are less than 1 micron for two consecutive times or not, or whether difference values between the current thickness of the cold-pressed pole piece and the preset target thickness are greater than 1 micron for two consecutive times or not.

Multiply the unit thickness adjust pressure XT by the difference value between the current thickness and the preset target thickness to obtain the thickness adjust pressure if the difference values between the current thickness of the cold-pressed pole piece and the preset target thickness are less than 1 micron for two consecutive times. Control the cold press to decrease the thickness adjust pressure.

Multiply the unit thickness adjust pressure XT by the difference value between the current thickness and the preset target thickness to obtain the thickness adjust pressure if the difference values between the current thickness of the cold-pressed pole piece and the preset target thickness are greater than 1 micron for two consecutive times. Control the cold press to increase the thickness adjust pressure.

After each time the cold pressing of a roll of pole piece is completed, obtained each-time pressure data satisfying design requirements in the current completion process, and the corresponding rolling speed and pole piece thickness can be automatically memorized, and then, regression model refitting is performed based on the data to update the regression model, the unit thickness adjust pressure and the second association subtable.

Embodiment 3

Based on the same inventive concept, the embodiment of the present application further provides a cold press pressure control apparatus 400 and a service request processing apparatus 200. Please refer to FIG. 4, and FIG. 4 illustrates a service request processing apparatus adopting the methods shown in FIG. 1 and FIG. 2. It should be understood that the specific functions of the apparatus 400 may refer to the above description, and to avoid repetition, detailed description is appropriately omitted here. The apparatus 400 includes at least one software function module that can be stored in a memory in the form of software or firmware or solidified in an operating system of the apparatus 400. Specifically:

referring to FIG. 4, the apparatus 400 includes: an acquisition module 401, a determination module 402 and a control module 403. Where:

the acquisition module 401 is configured to acquire a current thickness of a cold-pressed pole piece and a current rolling speed of a cold press at the moment;

the determination module 402 is configured to determine a cold press output pressure corresponding to the current thickness of the pole piece and the current rolling speed of the cold press according to the current thickness of the cold-pressed pole piece and the current rolling speed of the cold press at the moment, as well as a preset first association relationship; or, determine a cold press adjust pressure corresponding to the current thickness of the pole piece and the current rolling speed of the cold press according to the current thickness of the cold-pressed pole piece and the current rolling speed of the cold press at the moment, as well as a preset second association relationship, where the first association relationship is an association relationship among a pole piece thickness, a rolling speed of a cold press and the cold press output pressure, and the second association relationship is an association relationship among a pole piece thickness, a rolling speed of a cold press and the cold press adjust pressure; and the control module 403 is configured to control the cold press to perform pressure output according to the cold press output pressure or the cold press adjust pressure, so that at the next moment, the cold press performs cold pressing on the pole piece according to the cold press output pressure.

In the embodiment of the present application, the determination module 402 is specifically configured to:

determine a current operating condition of the cold press according to the current rolling speed and the rolling speed at the previous moment; determine a cold press output pressure corresponding to the current thickness of the pole piece and the current rolling speed of the cold press according to the current thickness and the current rolling speed, as well as the first association relationship corresponding to the current operating condition;

determine a current operating condition of the cold press according to the current rolling speed and the rolling speed at the previous moment; determine a cold press adjust pressure corresponding to the current thickness of the pole piece and the current rolling speed of the cold press according to the current thickness and the current rolling speed, as well as the second association relationship corresponding to the current operating condition.

In the embodiment of the present application, the acquisition module 401 is specifically configured to acquire a current first thickness of the pole piece at an operating side of the cold press and a current second thickness of the pole piece at a transmission side of the cold press at the moment.

The determination module 402 is specifically configured to:

determine a first cold press output pressure corresponding to the operating side according to the current first thickness and the current rolling speed, as well as a preset first association relationship corresponding to the operating side; determine a second cold press output pressure corresponding to the transmission side according to the current second thickness and the current rolling speed, as well as a preset first association relationship corresponding to the transmission side;

determine a first cold press adjust pressure corresponding to the operating side according to the current first thickness and the current rolling speed, as well as a preset second association relationship corresponding to the operating side; and determine a second cold press adjust pressure corresponding to the transmission side according to the current second thickness and the current rolling speed, as well as a preset second association relationship corresponding to the transmission side.

The control module 403 is specifically configured to control the operating side of the cold press to perform pressure output according to the first cold press output pressure or the first cold press adjust pressure; and to control the transmission side of the cold press to perform pressure output according to the second cold press output pressure or the second cold press adjust pressure.

In a feasible implementation of the embodiment of the present application, the first association relationship includes: a second association subtable among a corresponding unit thickness adjust pressure required to be adjusted by the cold press during unit thickness change of the pole piece, the rolling speed of the cold press and the cold press adjust pressure, where the cold press adjust pressure includes a thickness adjust pressure and a speed adjust pressure.

The determination module 402 is specifically configured to determine whether the current thickness of the cold-pressed pole piece satisfies a preset first pressure control condition or not and whether the current rolling speed of the cold press satisfies a preset second pressure control condition or not; determine a current thickness adjust pressure according to a difference value between the current thickness of the cold-pressed pole piece and a preset target thickness and the unit thickness adjust pressure when the current thickness of the cold-pressed pole piece satisfies the preset first pressure control condition; and determine a current speed adjust pressure corresponding to the current rolling speed according to a speed range where the current rolling speed is located and adjust pressures corresponding to different speed ranges when the current rolling speed satisfies the preset second pressure control condition.

The control module 403 is specifically configured to control the cold press to perform pressure output according to the current thickness adjust pressure and/or the current speed adjust pressure and a current actual output pressure of the cold press.

In the above feasible implementation, the first pressure control condition is: difference values between the current thicknesses of the pole piece acquired for n1 consecutive times and the preset target thickness being greater than a preset first thickness change threshold; or difference values between the current thicknesses of the pole piece acquired for n2 consecutive times and the preset target thickness being less than a preset second thickness change threshold; both the n1 and the n2 are positive integers greater than or equal to 1; and the first thickness change threshold is greater than the second thickness change threshold.

In the above feasible implementation, the second pressure control condition is: the change of the current rolling speed being greater than a preset first speed change threshold, or the change of the current rolling speed being less than a preset second speed change threshold, where the change of the current rolling speed is a difference value between the current rolling speed of the cold press and the previous rolling speed, and the first speed change threshold is greater than the second speed change threshold.

In a feasible implementation of the embodiment of the present application, the first association relationship and the second association relationship are regression models with a thickness, a speed and a pressure as variable values.

In the feasible executable example of the above feasible implementation, the acquisition module 401 is also configured to acquire a latest current thickness of the cold-pressed pole piece and a latest current rolling speed of the cold press after the cold press is stopped and restarted.

The determination module 402 is further configured to determine a cold press output pressure or a cold press adjust pressure corresponding to the latest current thickness and the latest current rolling speed according to the latest current thickness and the latest current rolling speed, as well as the regression model before stop and restart; and the control module 403 is further configured to control the stopped and restarted cold press to perform pressure output according to the cold press output pressure or the cold press adjust pressure, so that at the next moment, the cold press performs cold pressing on the pole piece according to the cold press output pressure.

In the above feasible executable example, the acquisition module 401 is further configured to determine the cold press output pressure or the cold press adjust pressure corresponding to the current thickness and the current rolling speed according to the latest current thickness and the latest current rolling speed, as well as the regression model before stop and restart, and reacquire a latest current thickness of the pole piece and a latest current rolling speed of the cold press at a pressure value newly output by the cold press after the stopped and restarted cold press is controlled, according to the cold press output pressure or the cold press adjust pressure, to perform pressure output; and the control module 403 is further configured to update, according to the reacquired latest current thickness, the reacquired latest current rolling speed and the pressure value, model parameters of the regression model when the reacquired latest current thickness satisfies preset reasonable thickness conditions, and the reacquired latest current rolling speed satisfies preset reasonable speed conditions.

It should be understood that for the sake of brevity, some of the content described in Embodiment 1 will not be repeated in this embodiment.

Embodiment 4

Figure 5:
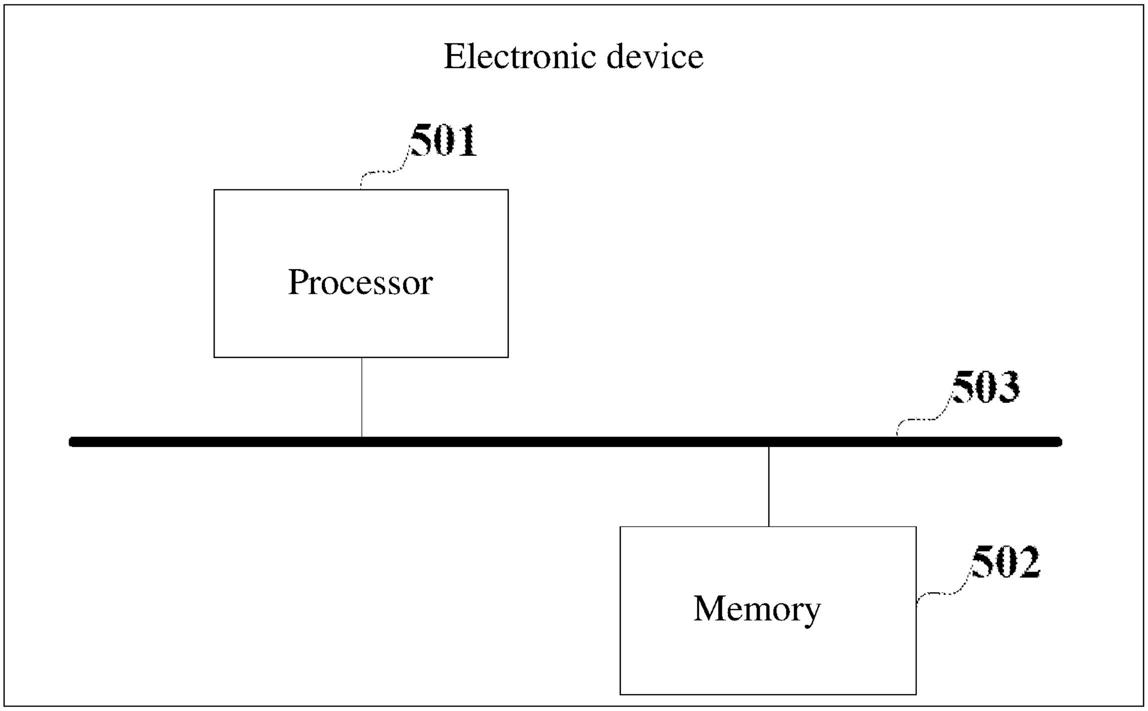
FIG. 5 is a schematic structural diagram of an electronic device according to an embodiment of the present application.

This embodiment provides an electronic device, as shown in FIG. 5, which includes a processor 501, a memory 502 and a communication bus 503. Where:

the communication bus 503 is configured to realize connection and communication between the processor 501 and the memory 502.

The memory 502 stores program codes for implementing a request converter, a process processor and a response converter in an interlayer provided by the embodiment of the present application.

The processor 501 is configured to call the program codes stored in the memory 502 to realize the cold press pressure control method in the above Embodiment 2.

It should be understood that the structure shown in FIG. 5 is only for illustration, and the electronic device may also include more or less components than those shown in FIG. 5, or have a configuration different from that shown in FIG. 5.

It should also be noted that the electronic device provided in this embodiment may be the cold press itself, in addition, it may also be a programmable logic controller (PLC), which may be installed in the cold press, or may be in communication connection with the cold press.

This embodiment further provides a computer-readable storage medium, such as a floppy disk, a light disk, a hard disk, a flash memory, a U disk, a secure digital memory card (SD), a multimedia card (MMC), etc. One or more programs for implementing the above steps are stored in the computer-readable storage medium, and the one or more programs can be executed by one or more processors to implement the above cold press pressure control method according to the above Embodiment 1 and/or the Embodiment 2. Repetition is not needed herein.

Finally, it should be noted that the above embodiments are merely used for illustrating rather than limiting the technical schemes of the present application; although the present application has been described in detail with reference to the above various embodiments, those of ordinary skill in the art should understand that the technical schemes recorded in the above various embodiments can still be modified, or some or all of the technical features therein can be equivalently substituted; and such modifications or substitutions do not make the essence of the corresponding technical schemes depart from the scope of the technical schemes of the various embodiments of the present application, which shall fall within the scope of the claims and the specification of the present application. In particular, the technical features mentioned in the various embodiments can be combined in any manner as long as there is no structure or execution sequence conflict. The present application is not limited to the specific embodiments disclosed herein, but rather includes all technical schemes falling within the scope of the claims.

The invention claimed is:

1. A cold press pressure control method, comprising:

acquiring a current thickness of a cold-pressed pole piece and a current rolling speed of a cold press at a moment;

determining a cold press output pressure corresponding to the current thickness of the pole piece and the current rolling speed of the cold press according to the current thickness of the cold-pressed pole piece and the current rolling speed of the cold press at the moment, as well as a preset first association relationship; or, determining a cold press adjust pressure corresponding to the current thickness of the pole piece and the current rolling speed of the cold press according to the current thickness of the cold-pressed pole piece and the current rolling speed of the cold press at the moment, as well as a preset second association relationship, wherein the first association relationship is an association relationship among a pole piece thickness, a rolling speed of a cold press and the cold press output pressure, and the second association relationship is an association relationship among a pole piece thickness, a rolling speed of a cold press and the cold press adjust pressure; and controlling the cold press to perform pressure output according to the cold press output pressure or the cold press adjust pressure, so that at the next moment, the cold press performs cold pressing on the pole piece according to the cold press output pressure;

wherein the first association relationship comprises: a second association subtable among a corresponding unit thickness adjust pressure required to be adjusted by the cold press during unit thickness change of the pole piece, the rolling speed of the cold press and the cold press adjust pressure, the cold press adjust pressure comprising a thickness adjust pressure and a speed adjust pressure;

wherein the determining a cold press adjust pressure corresponding to the current thickness of the pole piece and the current rolling speed of the cold press according to the current thickness of the cold-pressed pole piece and the current rolling speed of the cold press at the moment, as well as a preset second association relationship comprises:

determining whether the current thickness of the cold-pressed pole piece satisfies a preset first pressure control condition or not and whether the current rolling speed of the cold press satisfies a preset second pressure control condition or not;

determining a current thickness adjust pressure according to a difference value between the current thickness of the cold-pressed pole piece and a preset target thickness and the unit thickness adjust pressure when the current thickness of the cold-pressed pole piece satisfies the preset first pressure control condition; and determining a current speed adjust pressure corresponding to the current rolling speed according to a speed range where the current rolling speed is located and the adjust pressures corresponding to different speed ranges when the current rolling speed satisfies the preset second pressure control condition; and correspondingly, the controlling the cold press to perform pressure output according to the cold press adjust pressure comprises:

controlling the cold press to perform pressure output according to the current thickness adjust pressure and/or the current speed adjust pressure and a current actual output pressure of the cold press.

2. The cold press pressure control method according to claim 1, wherein:

the determining a cold press output pressure corresponding to the current thickness of the pole piece and the current rolling speed of the cold press according to the current thickness of the cold-pressed pole piece and the current rolling speed of the cold press at the moment, as well as a preset first association relationship comprises:

determining a current operating condition of the cold press according to the current rolling speed and a rolling speed at the previous moment; and determining the cold press output pressure corresponding to the current thickness of the pole piece and the current rolling speed of the cold press according to the current thickness and the current rolling speed, as well as the first association relationship corresponding to the current operating condition; and the determining a cold press adjust pressure corresponding to the current thickness of the pole piece and the current rolling speed of the cold press according to the current thickness of the cold-pressed pole piece and the current rolling speed of the cold press at the moment, as well as a preset second association relationship comprises:

determining a current operating condition of the cold press according to the current rolling speed and a rolling speed at the previous moment; and determining the cold press adjust pressure corresponding to the current thickness of the pole piece and the current rolling speed of the cold press according to the current thickness and the current rolling speed, as well as the second association relationship corresponding to the current operating condition.

3. The cold press pressure control method according to claim 1, wherein the acquiring a current thickness of a cold-pressed pole piece at the moment comprises:

acquiring a current first thickness of the pole piece at an operating side of the cold press and a current second thickness of the pole piece at a transmission side of the cold press at the moment;

the determining a cold press output pressure corresponding to the current thickness of the pole piece and the current rolling speed of the cold press according to the current thickness of the cold-pressed pole piece and the current rolling speed of the cold press at the moment, as well as a preset first association relationship comprises:

determining a first cold press output pressure corresponding to the operating side according to the current first thickness and the current rolling speed, as well as a preset first association relationship corresponding to the operating side; and determining a second cold press output pressure corresponding to the transmission side according to the current second thickness and the current rolling speed, as well as a preset first association relationship corresponding to the transmission side;

the determining a cold press adjust pressure corresponding to the current thickness of the pole piece and the current rolling speed of the cold press according to the current thickness of the cold-pressed pole piece and the current rolling speed of the cold press at the moment, as well as a preset second association relationship comprises:

determining a first cold press adjust pressure corresponding to the operating side according to the current first thickness and the current rolling speed, as well as a preset second association relationship corresponding to the operating side; and determining a second cold press adjust pressure corresponding to the transmission side according to the current second thickness and the current rolling speed, as well as a preset second association relationship corresponding to the transmission side; and the controlling the cold press to perform pressure output according to the cold press output pressure or the cold press adjust pressure comprises:

controlling the operating side of the cold press to perform pressure output according to the first cold press output pressure or the first cold press adjust pressure; and controlling the transmission side of the cold press to perform pressure output according to the second cold press output pressure or the second cold press adjust pressure.

4. The cold press pressure control method according to claim 1, wherein the first pressure control condition is:

difference values between the current thicknesses of the pole piece acquired for n1 consecutive times and the preset target thickness being greater than a preset first thickness change threshold;

or difference values between the current thicknesses of the pole piece acquired for n2 consecutive times and the preset target thickness being less than a preset second thickness change threshold;

both the n1 and the n2 are positive integers greater than or equal to 1; and the first thickness change threshold is greater than the second thickness change threshold.

5. The cold press pressure control method according to claim 1, wherein the second pressure control condition is: the change of the current rolling speed being greater than a preset first speed change threshold, or the change of the current rolling speed being less than a preset second speed change threshold, wherein:

the change of the current rolling speed is a difference value between the current rolling speed of the cold press and the previous rolling speed, and the first speed change threshold is greater than the second speed change threshold.

6. The cold press pressure control method according to claim 1, wherein the first association relationship and the second association relationship are regression models with a thickness, a speed and a pressure as variable values.

7. The cold press pressure control method according to claim 6, wherein after the cold press is stopped and restarted, the method further comprises:

acquiring a latest current thickness of the cold-pressed pole piece and a latest current rolling speed of the cold press;

determining a cold press output pressure or cold press adjust pressure corresponding to the latest current thickness and the latest current rolling speed according to the latest current thickness and the latest current rolling speed, as well as the regression model before stop and restart; and controlling the stopped and restarted cold press to perform pressure output according to the cold press output pressure or cold press adjust pressure, so that at the next moment, the cold press performs cold pressing on the pole piece according to the cold press output pressure.

8. A cold press pressure control method, comprising:

acquiring a current thickness of a cold-pressed pole piece and a current rolling speed of a cold press at the moment;

determining a cold press output pressure corresponding to the current thickness of the pole piece and the current rolling speed of the cold press according to the current thickness of the cold-pressed pole piece and the current rolling speed of the cold press at the moment, as well as a preset first association relationship; or, determining a cold press adjust pressure corresponding to the current thickness of the pole piece and the current rolling speed of the cold press according to the current thickness of the cold-pressed pole piece and the current rolling speed of the cold press at the moment, as well as a preset second association relationship, wherein the first association relationship is an association relationship among a pole piece thickness, a rolling speed of a cold press and the cold press output pressure, and the second association relationship is an association relationship among a pole piece thickness, a rolling speed of a cold press and the cold press adjust pressure; and controlling the cold press to perform pressure output according to the cold press output pressure or the cold press adjust pressure, so that at the next moment, the cold press performs cold pressing on the pole piece according to the cold press output pressure;

wherein the first association relationship and the second association relationship are regression models with a thickness, a speed and a pressure as variable values; and wherein after the cold press is stopped and restarted, the method further comprises:

acquiring a latest current thickness of the cold-pressed pole piece and a latest current rolling speed of the cold press;

determining a cold press output pressure or cold press adjust pressure corresponding to the latest current thickness and the latest current rolling speed according to the latest current thickness and the latest current rolling speed, as well as the regression model before stop and restart; and controlling the stopped and restarted cold press to perform pressure output according to the cold press output pressure or cold press adjust pressure, so that at the next moment, the cold press performs cold pressing on the pole piece according to the cold press output pressure;

wherein after the determining a cold press output pressure or cold press adjust pressure corresponding to the current thickness and the current rolling speed according to the latest current thickness and the latest current rolling speed, as well as the regression model before stop and restart, and controlling the stopped and restarted cold press to perform pressure output according to the cold press output pressure or cold press adjust pressure, the method further comprises:

reacquiring a latest current thickness of the pole piece and a latest current rolling speed of the cold press at a pressure value newly output by the cold press; and updating, according to the reacquired latest current thickness, the reacquired latest current rolling speed and the pressure value, model parameters of the regression model when the reacquired latest current thickness satisfies preset reasonable thickness conditions, and the reacquired latest current rolling speed satisfies preset reasonable-speed conditions.

9. An electronic device, comprising: a processor, a memory and a communication bus;

the communication bus being configured to realize connection and communication between the processor and the memory; and the processor being configured to execute one or more programs stored in the memory, so as to implement the cold press pressure control method according to claim 1.

* * * * *